(12) United States Patent
Galifi

(10) Patent No.: US 12,292,289 B2
(45) Date of Patent: May 6, 2025

(54) DEVICE FOR DETERMINING MOTION IN VIRTUAL OR REAL SPACES

(71) Applicants: Pietro Galifi, Formello (IT); Stefano Moretti, Rome (IT); Alessandro Furlan, Reggio Emilia (IT)

(72) Inventor: Pietro Galifi, Formello (IT)

(73) Assignees: Galifi Pietro, Formello (IT); Moretti Stefano, Rome (IT); Furlan Alessandro, Rome (IT)

( * ) Notice: Subject to any disclaimer, the term of this patent is extended or adjusted under 35 U.S.C. 154(b) by 0 days.

(21) Appl. No.: 17/040,372

(22) PCT Filed: Mar. 21, 2019

(86) PCT No.: PCT/EP2019/057157
§ 371 (c)(1),
(2) Date: Sep. 22, 2020

(87) PCT Pub. No.: WO2019/180175
PCT Pub. Date: Sep. 26, 2019

(65) Prior Publication Data
US 2021/0055786 A1 Feb. 25, 2021

(30) Foreign Application Priority Data
Mar. 22, 2018 (IT) .................. 102018000003863

(51) Int. Cl.
*G01C 21/16* (2006.01)
*A43B 3/44* (2022.01)
(Continued)

(52) U.S. Cl.
CPC .............. *G01C 21/166* (2020.08); *A43B 3/44* (2022.01); *A43B 3/48* (2022.01); *A43B 13/145* (2013.01);
(Continued)

(58) Field of Classification Search
CPC ...... G06F 3/011; G06F 3/0346; G06F 3/0334; A63F 13/211; A63F 13/212;
(Continued)

(56) References Cited

U.S. PATENT DOCUMENTS 5,142,797 A * 9/1992 Cole, III ............... A43B 13/146
36/102
5,491,909 A * 2/1996 Darby ................... A61F 5/0195
36/76 R (Continued)

FOREIGN PATENT DOCUMENTS

EP 1124462 A1 8/2001
GB 2458741 A 10/2009
(Continued)

OTHER PUBLICATIONS

Cybershoes, "Introduction of Cybershoes by 3D RUN", Apr. 20, 2017 (Apr. 20, 2017), p. 1, Retrieved from the Internet: URL:https://www.youtube.com/watch?time_continue=6&v=ghP7l2luZXo; XP054978871.

(Continued)

*Primary Examiner* — James J Yang
(74) *Attorney, Agent, or Firm* — CANTOR COLBURN LLP

(57) ABSTRACT

A device for determining motion in virtual or real spaces is arranged inside at least one shoe, provided with a sole which can tilt along one or more directions. The device includes at least one gyroscope provided with an accelerometer, a module for transmitting data to a virtual reality viewing device or to a computer, which include elements adapted to process the data in order to provide the direction of motion in the virtual or real space, a power supply source.

16 Claims, 4 Drawing Sheets

(51) Int. Cl.
*A43B 3/48* (2022.01)
*A43B 13/14* (2006.01)
*A63F 13/211* (2014.01)
*A63F 13/212* (2014.01)
*G06F 3/01* (2006.01)
*G06F 3/033* (2013.01)
*G06F 3/0346* (2013.01)

(52) U.S. Cl.
CPC .......... *A63F 13/211* (2014.09); *A63F 13/212* (2014.09); *G06F 3/011* (2013.01); *G06F 3/0334* (2013.01); *G06F 3/0346* (2013.01)

(58) Field of Classification Search
CPC ... A63F 13/214; A43B 3/0005; A43B 13/145; A43B 3/34; A43B 13/143; G01C 21/166
See application file for complete search history.

(56) References Cited

U.S. PATENT DOCUMENTS

| | | | |
|---|---|---|---|
| 5,644,857 A * | 7/1997 | Ouellette | A43B 3/24 |
| | | | 36/15 |
| 6,345,454 B1 * | 2/2002 | Cotton | A43B 3/24 |
| | | | 36/15 |
| 6,421,935 B1 * | 7/2002 | Bartlett | A43B 13/143 |
| | | | 482/79 |
| 6,643,956 B2 * | 11/2003 | Mawusi | A43B 13/12 |
| | | | 36/26 |
| 7,454,309 B2 * | 11/2008 | Lawrence | G06F 1/163 |
| | | | 345/157 |
| 10,455,888 B2 * | 10/2019 | Davenport | A43B 13/148 |
| 10,779,612 B2 * | 9/2020 | Hansen | B32B 5/32 |
| 11,432,615 B2 * | 9/2022 | Ellis | A43B 17/026 |
| 2002/0026730 A1 * | 3/2002 | Whatley | A43B 13/36 |
| | | | 482/79 |
| 2005/0120589 A1 * | 6/2005 | Coomes | A43B 13/30 |
| | | | 36/15 |
| 2008/0190202 A1 | 8/2008 | Kulach et al. | |
| 2010/0063778 A1 * | 3/2010 | Schrock | A63B 24/0062 |
| | | | 702/188 |
| 2014/0031123 A1 * | 1/2014 | Sarrafzadeh | A63F 13/428 |
| | | | 463/36 |
| 2014/0047740 A1 * | 2/2014 | Tucker | A43B 13/223 |
| | | | 36/83 |
| 2014/0230281 A1 * | 8/2014 | Engell | A43B 13/146 |
| | | | 36/102 |
| 2015/0226619 A1 * | 8/2015 | Rice | A43B 7/084 |
| | | | 73/862.046 |
| 2015/0359457 A1 * | 12/2015 | Blumenthal | G06F 3/011 |
| | | | 73/172 |
| 2016/0345668 A1 * | 12/2016 | Dyer | A43B 13/186 |
| 2017/0239551 A1 | 8/2017 | Pease et al. | |
| 2017/0262049 A1 * | 9/2017 | Kim | G06F 3/011 |
| 2017/0300132 A1 | 10/2017 | Hiroi et al. | |
| 2018/0236352 A1 * | 8/2018 | El-Sheimy | G06F 3/011 |
| 2018/0255868 A1 * | 9/2018 | Cole | A43B 13/42 |
| 2019/0339791 A1 * | 11/2019 | Alanajadah | G06F 3/011 |
| 2020/0020165 A1 * | 1/2020 | Tran | G06N 20/10 |
| 2020/0229736 A1 * | 7/2020 | Saporito | G06K 9/6265 |

FOREIGN PATENT DOCUMENTS

| | | |
|---|---|---|
| KR | 20150118776 A | 10/2015 |
| KR | 20170004589 A | 1/2017 |
| WO | 0115560 A1 | 3/2001 |
| WO | 2017093814 A1 | 6/2017 |

OTHER PUBLICATIONS

International Search Report issued May 24, 2019 re: Application No. PCT/EP2019/057157, pp. 1-4, citing: WO 2017/093814 A1, US 2008/0190202 A1, US 2017/0239551 A1, KR 2017 0004589 A, US 2017/0300132 A1, KR 2015 0118776 A and Cybershoes "Introduction of Cybershoes . . . ."

Written Opinion issued May 24, 2019 re: Application No. PCT/EP2019/057157, pp. 1-4, citing: WO 2017/093814 A1, US 2008/0190202 A1, US 2017/0239551 A1, KR 2017 0004589 A, US 2017/0300132 A1 and KR 2015 0118776 A.

IT Search Report issued Nov. 16, 2018 re: Application No. IT 2018000003863, pp. 1-25, citing: WO 2017/093814 A1, US 2008/0190202 A1, US 2017/0239551 A1, KR 2017 0004589 A, US 2017/0300132 A1, KR 2015 0118776 A and Cybershoes "Introduction of Cybershoes . . . ."

EP Examination issued Nov. 11, 2021 re: Application No. 19 712 196.5-1001, pp. 1-5.

European Office Action for Application No. 19712196.5, dated Dec. 22, 2023, 4 pages.

Chinese Office Action for corresponding application 201980020957.3; Report dated Feb. 29, 2024.

Chinese Office Action for Application No. 201980020957.3, dated Oct. 31, 2024, 12 pages.

* cited by examiner

DEVICE FOR DETERMINING MOTION IN VIRTUAL OR REAL SPACES

TECHNICAL FIELD

The present disclosure relates to a device for determining motion, for example of the human body or of a robot or drone, in virtual or real spaces.

BACKGROUND

Devices are currently known which allow for example a videogame player to view his position within a simulated space; they comprise a device for virtual reality viewing, constituted essentially by a viewer which can be worn by a user (also known as VR viewer), which is provided with means which communicate with a computer and with sensors, arranged around the user in order to delimit his movements in real space, or with peripherals (joysticks) held by the user.

These devices are complex, they require the user to have a certain skill and in any case considerable time to adapt to their use.

SUMMARY

The aim of the present disclosure is therefore to solve the described technical problems, eliminating the drawbacks of the cited background art and thus providing a device that allows to determine motion in virtual or real spaces in the absence of peripherals that can be held by the user and of external sensors that recognize the movements of the user.

Within this aim, the disclosure provides a device for determining motion in virtual or real spaces that is straightforward and simple to use for the user.

The disclosure provides a device which associates with the preceding characteristics that of being usable with the user in a static and therefore stationary condition.

The disclosure also provides a device that is structurally simple and has low production costs.

This aim and these advantages, as well as others which will become better apparent hereinafter, are achieved by providing a device for determining motion in virtual or real spaces, wherein the device is adapted to be arranged inside at least one shoe, provided with a sole which can tilt along one or more directions, and in that it comprises at least one gyroscope provided with an accelerometer, a module for transmitting data to a virtual reality viewing device or to a computer, which comprise means adapted to process said data in order to provide the direction of motion in the virtual or real space, a power supply source.

BRIEF DESCRIPTION OF THE DRAWINGS

Further characteristics and advantages of the disclosure will become better apparent from a detailed description of a particular but not exclusive embodiment, illustrated by way of nonlimiting example in the accompanying drawings, wherein.

DETAILED DESCRIPTION OF THE DRAWINGS

Figure 1:
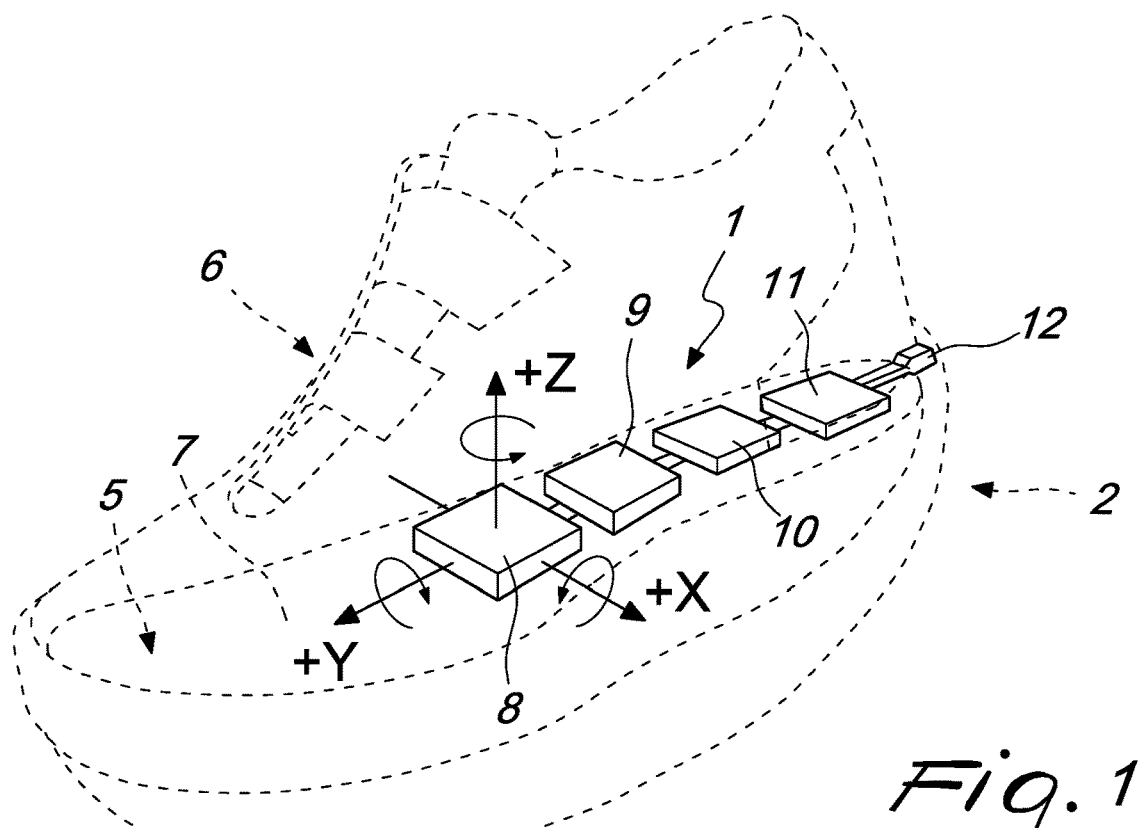
FIG. 1 is a view of the device applied to the shoe.
Figure 2:
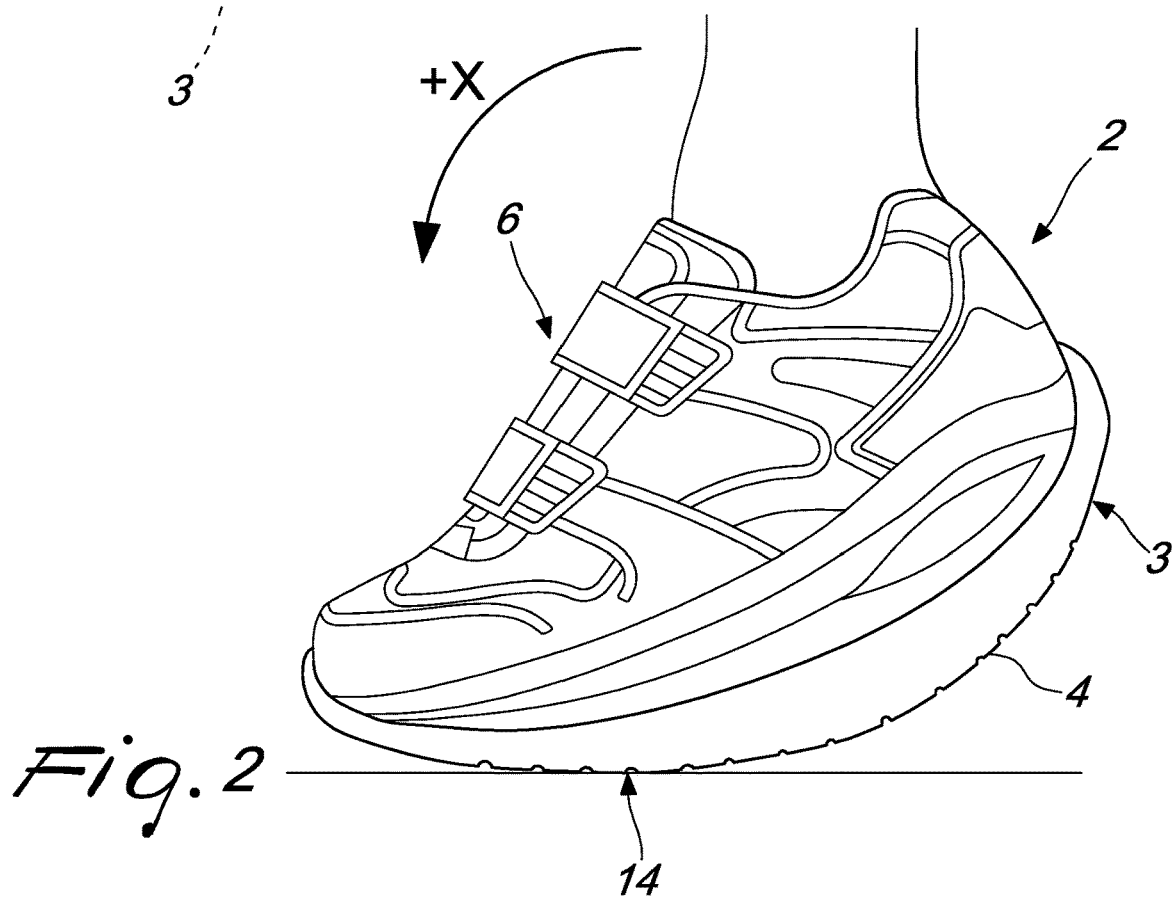
FIG. 2 is a view of the condition in which the foot is inclined forward.

In the following embodiments, individual characteristics, given in relation to specific examples, may actually be interchanged with other different characteristics that exist in other embodiments.

With reference to the figures, the reference numeral 1 designates a device for determining motion, for example of the human body or of a robot or of a drone, in virtual spaces.

The device is adapted to be arranged inside a shoe 2, of the type provided with a sole 3 which can tilt along one or more directions or with a tilting sole 3 associated below it.

The sole 3 is provided with a lower surface 4 which is variously arc-shaped and is such as to allow to achieve an oscillating movement of the foot, during walking, on a plane that is substantially perpendicular to the ground in a longitudinal and/or transverse direction with respect to the foot.

A possible example of this shoe is described in EP1124462B1 or in GB2458741A.

However, the shoe type that can be used may be the most disparate; for example, it may also be a normal shoe provided with a substantially flat sole with which an additional sole 3 provided with a chosen curvature, which is more or less large in one or more chosen regions thereof, is to be associated for example in a removable manner.

In this case, the device 1 may be associated/embedded either with the normal shoe or with the additional sole 3.

It is thus possible to tilt the foot forward or keep it substantially horizontal or tilt it backward, being able to reach of course all the various intermediate positions, as well as to optionally tilt the foot sideways to the right or to the left.

The accompanying drawings show the main configurations that can be assumed by the sole 3 with respect to the ground on which it rests in a particular constructive solution which provides, by way of nonlimiting example, only the forward and backward oscillating motion of the foot; thus, the letter X designates the arrangement of the foot in space, assuming that:

with X=0 the foot is in the horizontal position;
with X>0 the foot is inclined forward;
with X<0 the foot is inclined backward.

The device 1 is advantageously arranged above or below or embedded in an insole 5 which is located within the upper 6 or can be arranged in an adapted seat, not shown, provided directly on the internal surface 7 of the sole 3 below the insole 5.

The device 1 is constituted by at least one gyroscope 8, which is provided, internally or coupled thereto, with a three-axis digital accelerometer, a data transmission module 9, such as a radio module which comprises a central processing unit (or CPU) with modules for wireless data transmission, such as the Bluetooth standard and/or Wi-Fi technology, connected thereto.

The module 9 can thus be connected to at least one device (head display unit), of a known type which is not shown and can be worn by a user, for viewing in virtual reality or on a computer, both comprising means adapted to process said data in order to provide the direction of motion in virtual space.

The computer can for example be associated also with a robot or with a drone.

The shoe 2 furthermore comprises advantageously a power source 10 provided with means for charging it, such as a battery charging module 11 and a connector 12 for charging by means of a micro USB connection.

As shown in FIGS. 5 to 13, upon a forward or backward motion imparted to the shoe by the user, standing stationary or even sitting, the gyroscope 8 detects and transmits the data related to the inclination of the sole of the foot to the device for viewing in virtual reality or on the computer.

The letters $X_s$ and $X_d$ designate, in the mentioned figures, the movements that can be ascribed to the left foot ($X_s$) and to the right foot ($X_d$).

The data related to the right movements $X_d$ and left movements $X_s$ are transmitted, via the module 9 over Bluetooth or Wi-Fi, to the head display unit for virtual reality or to a computer connected thereto in order to be processed in their combinations, providing the direction of motion in virtual or real space.

The combination of the values of $X_s$ and $X_d$ in the various steps of inclinations of the feet provides the various movements or curvature angles and defines a method of determining motion according to the present disclosure.

Figure 5:
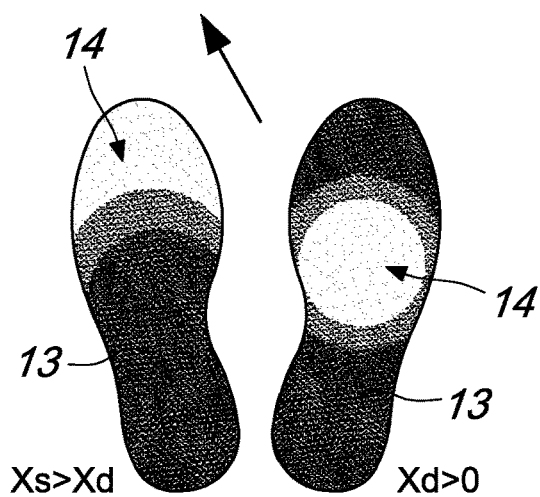
FIGS. 5 to 13 are plan views of the projection of the regions of the sole in contact with the ground.
Figure 6:
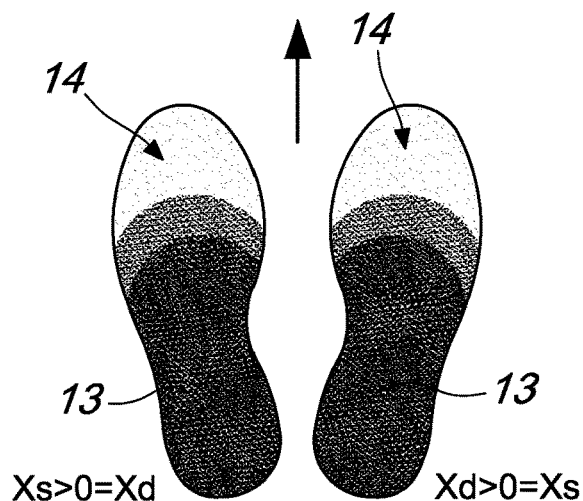
Figure 7:
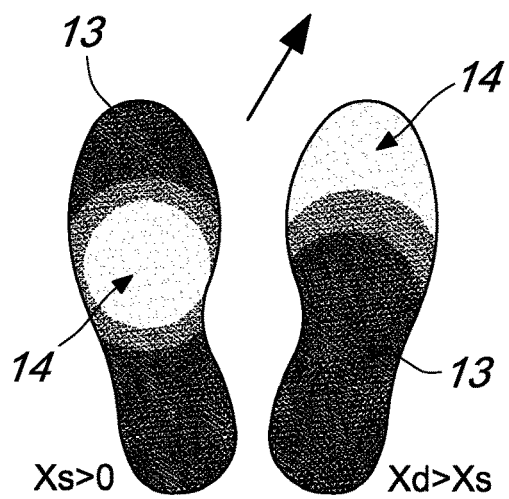
Figure 8:
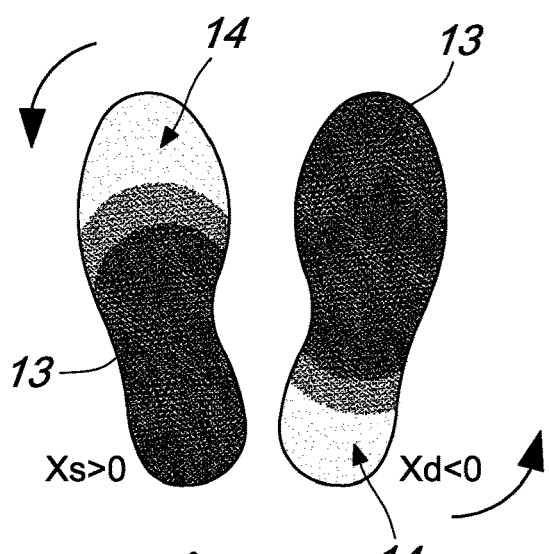

Thus, for example, when the feet define the movement shown in FIG. 5, in which $X_s > X_d$ and $X_d > 0$ the direction of motion in virtual space is forward to the left.

In the accompanying FIGS. 5 to 13, the reference numeral 13 designates the projection (black region) of the sole 2 on the ground and the reference numeral 14 designates the areas of the sole 2 that are substantially in contact (light colored region) or closest (gray region) with respect to the ground.

Figure 3:
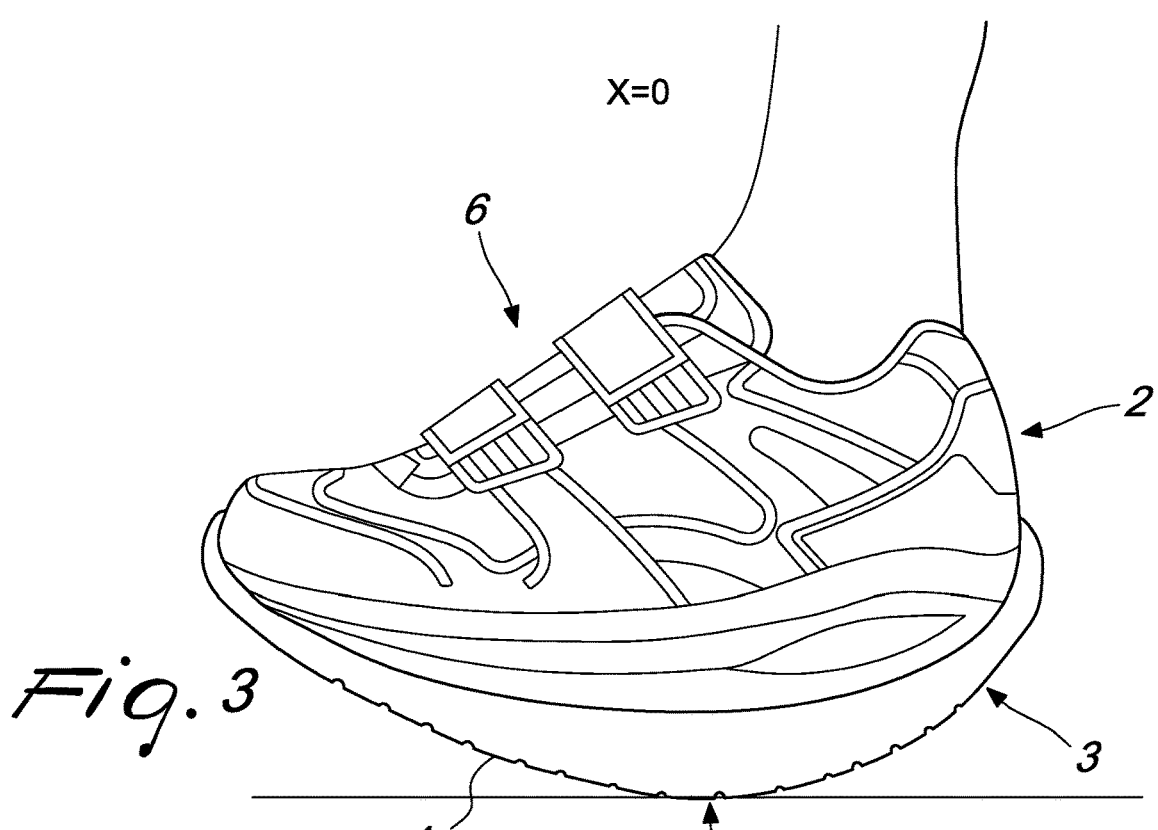
FIG. 3 is a view of the condition in which the foot is arranged horizontally.
Figure 4:
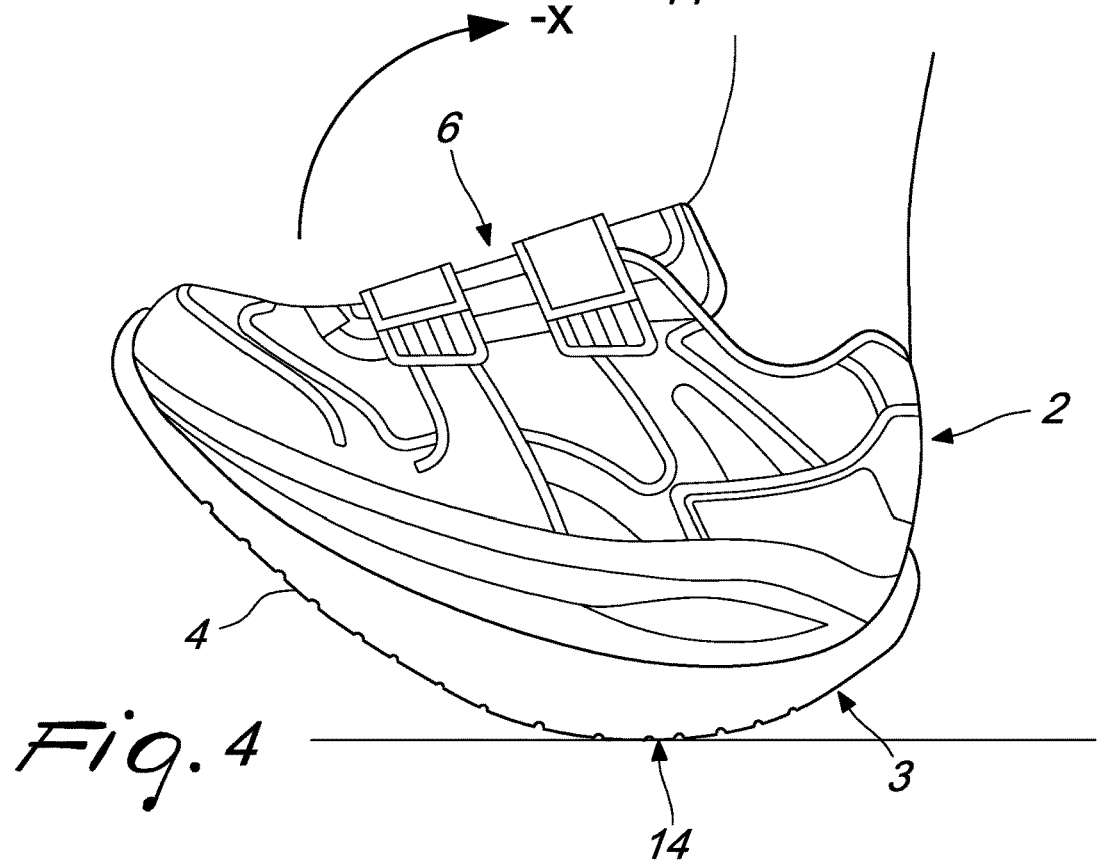
FIG. 4 is a view of the condition in which the foot is inclined backward.
Figure 9:
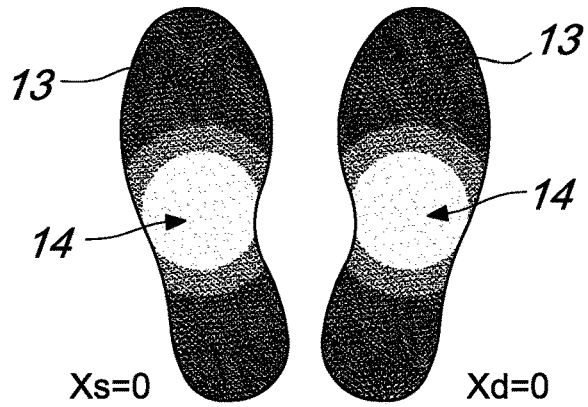
Figure 10:
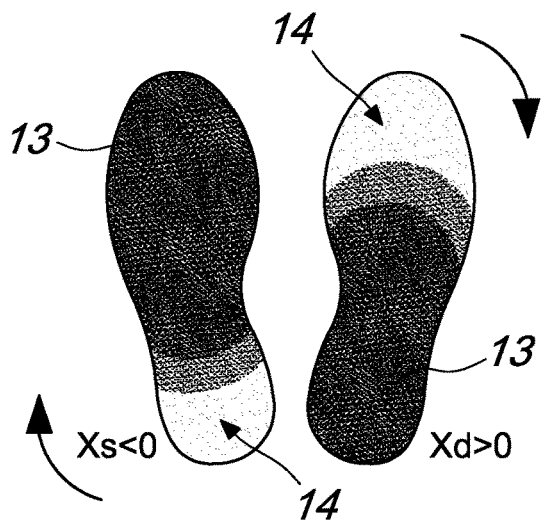
Figure 11:
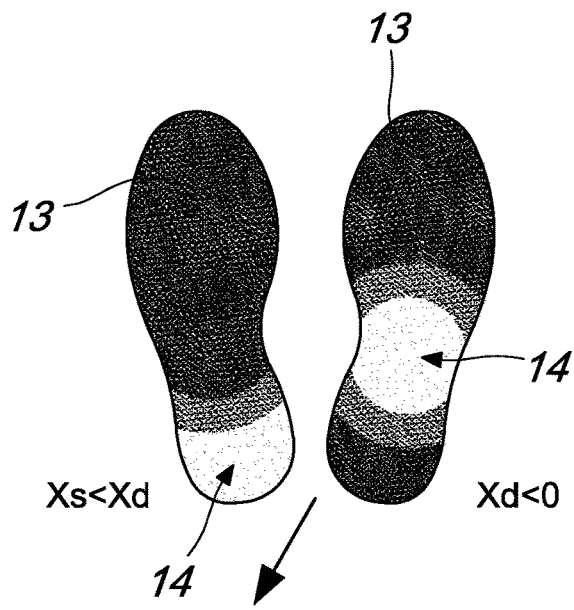
Figure 12:
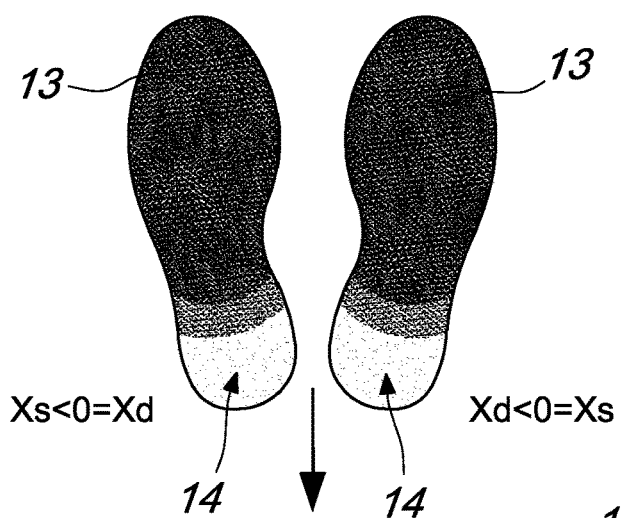
Figure 13:
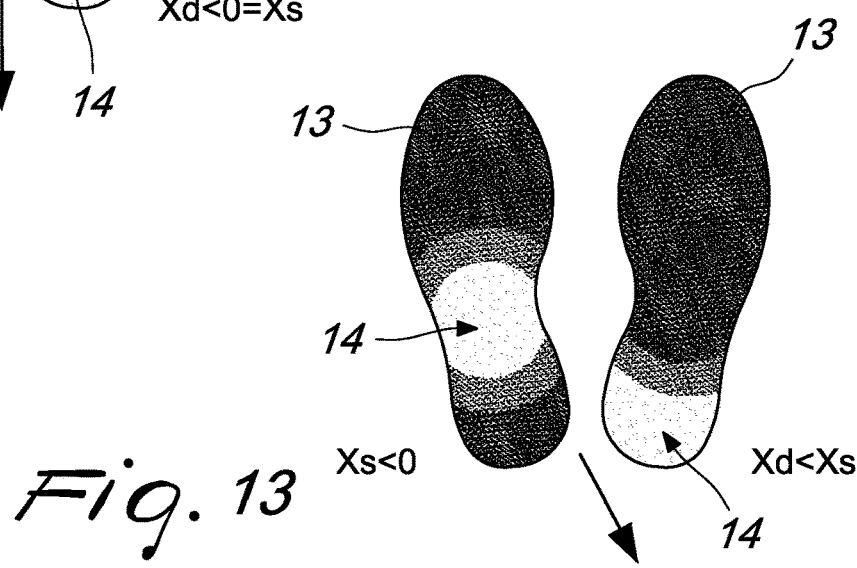

X=0 designates a position, shown in FIGS. 3 and 9, in which the foot is in equilibrium in a substantially horizontal position.

–X designates a position, shown in FIGS. 4, 8, 10, 11, 12 and 13, in which the foot is inclined backward, towards the calcaneum or heel.

+X designates a position, shown in FIGS. 2, 5, 6, 7, 8 and 10, in which the foot is inclined forward, toward the toes.

When $X_s > 0 = X_d$ and $X_d > 0 = X_s$ (see FIG. 6), the direction of motion in virtual or real space is forward.

When $X_s > 0$ and $X_d > X_s$ (see FIG. 7), the direction of motion in virtual or real space is forward and to the right.

When $X_s > 0$ and $X_d < 0$ (see FIG. 8), the direction of motion in virtual or real space is a counterclockwise rotation.

When $X_s = 0$ and $X_d = 0$ (see FIG. 9), the direction of motion in virtual or real space is stall.

When $X_s < 0$ and $X_d > 0$ (see FIG. 10), the direction of motion in virtual or real space is a clockwise rotation.

When $X_s < X_d$ and $X_d < 0$ (see FIG. 11), the direction of motion in virtual or real space is backward and to the left.

When $X_s < 0 = X_d$ and $X_d < 0 = X_s$ (see FIG. 12), the direction of motion in virtual or real space is backward.

When $X_s < 0$ and $X_d < X_s$ (see FIG. 13), the direction of motion in virtual or real space is backward and to the right.

Additional commands in order to determine a different and chosen position in virtual or real space may be imparted by means of other simple movements, such as for example synchronous or non-synchronous tapping of the toes and/or heels of the shoes on the ground: they are detected by the accelerometer and transmitted via the radio module 9 to the device (head display unit) for viewing in virtual reality or on the computer which will process them, defining the chosen motion in virtual or real space.

It has thus been found that the disclosure has achieved the intended aim and advantages, a device having been obtained which allows to determine motion in virtual or real spaces simply by tilting or not the shoes worn by the user, without said user having to hold joysticks or use external sensors that recognize his movements.

The device is therefore straightforward, simple and intuitive to use for the user and is structurally simple.

The materials used, as well as the dimensions and the technical characteristics that constitute the individual components of the disclosure, may of course be more pertinent according to the specific requirements.

The characteristics indicated as advantageous, convenient or the like may also be omitted or be replaced with equivalents.

The disclosures in Italian Patent Application No. 102018000003863 from which this application claims priority are incorporated herein by reference.

The invention claimed is:

1. A system comprising: at least one shoe provided with a sole configured to tilt along one or more directions, and a device for determining motion in virtual or real spaces, the device for determining motion being arranged inside the shoe and comprising at least one gyroscope, an accelerometer, and a module for transmitting data values detected by said gyroscope and accelerometer from said device for determining motion to a virtual reality viewing device or to a computer, which comprise means adapted to process said data values to provide a direction of motion in the virtual or real space, and a power supply source,
   wherein said sole has a lower surface which is variously arc-shaped such that said lower surface is a continuous portion of a curved line and has a continuous curvature from a start of a toe portion to an end of a heel portion, said sole being configured to allow, when worn on a foot, to achieve an oscillating movement of said foot on at least one plane that is substantially perpendicular to the ground so as to define, for the foot, a forward or substantially horizontal or backward inclination and other intermediate or lateral inclinations; said data values being the values of said inclinations so that the direction of motion in the virtual or real space can be commanded by varying the inclination of the foot, wherein the movement is imparted to said shoe by the user either standing stationary or sitting,
   wherein if X is a position of the foot in space, with X=0 the foot is in a horizontal position, with X>0 the foot is in a position that is inclined forward, with X<0 the foot is in a position that is inclined backward, said gyroscope detects and transmits the data values of the inclination of the lower surface with respect to the ground to said device for viewing in virtual reality or to said computer, wherein if Xs designated the inclination of a left foot and Xd designate the inclination of a right foot (Xd), the data values of said inclinations Xd and Xs are transmitted, via a radio module over Bluetooth or Wi-Fi, to said head display unit for virtual reality or to said computer connected thereto to be processed in their combinations, providing the direction of motion in virtual space or the direction of motion of a robot or drone in the real space, wherein a combination of said data values of Xs and Xd in the various steps of inclination of the feet provides the different movements in virtual or real space.

2. The system according to claim 1, wherein said accelerometer is a three-axis digital accelerometer, said module for transmitting data being said radio module which comprises a central processing unit with connected modules for wireless data transmission.

3. The system according to claim 1, wherein when $X_s > X_d$ and $X_d > 0$, the direction of motion in virtual space is forward and to the left.

4. The system according to claim 1, wherein when $X_s > 0 = X_d$ and $X_d > 0 = X_s$, the direction of motion in virtual or real space is forward.

5. The system according to claim 1, wherein when $X_s > 0$ and $X_d > X_s$, the direction of motion in virtual or real space is forward and to the right.

6. The system according to claim 1, wherein when $X_s > 0$ and $X_d < 0$, the direction of motion in virtual or real space is a counterclockwise rotation.

7. The system according to claim 1, wherein when $X_s = 0$ and $X_d = 0$, the direction of motion in virtual or real space is stall.

8. The system according to claim 1, wherein when $X_s < 0$ and $X_d > 0$, the direction of motion in virtual or real space is a clockwise rotation.

9. The system according to claim 1, wherein when $X_s < X_d$ and $X_d < 0$, the direction of motion in virtual or real space is backward and to the left.

10. The system according to claim 1, wherein when $X_s < 0 = X_d$ and $X_d < 0 = X_s$, the direction of motion in virtual or real space is backward.

11. The system according to claim 1, wherein when $X_s < 0$ and $X_d < X_s$, the direction of motion in virtual or real space is backward and to the right.

12. The system according to claim 1, wherein said power supply source is provided with means for recharging it.

13. The system according to claim 1, wherein the device is arranged above, below, or embedded in an insole which is arranged within an upper or is arranged in a seat provided directly on an internal surface of said sole located below said insole.

14. The system according to claim 2, wherein said module for transmitting data is configured to transmit said data values to a computer comprising means adapted to process said data values to provide the direction of motion, in virtual or real space, said computer being connected with a robot or a drone to be driven in the real space.

15. The system according to claim 1, wherein said sole does not include any linear or planar portions.

16. The system according to claim 1, wherein said sole is removable.

* * * * *

UNITED STATES PATENT AND TRADEMARK OFFICE
CERTIFICATE OF CORRECTION

PATENT NO. : 12,292,289 B2
APPLICATION NO. : 17/040372
DATED : May 6, 2025
INVENTOR(S) : Pietro Galifi Page 1 of 1

It is certified that error appears in the above-identified patent and that said Letters Patent is hereby corrected as shown below:

On the Title Page

Item (73), the address of Assignee 3, Alessandro FURLAN, should read "REGGIO EMILIA (IT)".

Signed and Sealed this
Seventh Day of October, 2025

John A. Squires
*Director of the United States Patent and Trademark Office*